Patented Oct. 29, 1946

UNITED STATES PATENT OFFICE 2,410,305

POLYMERIZED ESTERS OF CARBOXYLIC ACIDS AND PREPARATION OF SAME

Henry J. Richter and Henry S. Rothrock, Wilmington, Del., assignors to E. I. du Pont de Nemours & Company, Wilmington, Del., a corporation of Delaware No Drawing. Application March 13, 1940, Serial No. 323,722

10 Claims. (Cl. 260—78)

This invention relates to polymerized esters of organic polybasic acids wherein at least two of the acidic hydroxyls are attached to the same carbon atom, in which esters the carbon atom of a carboxylic acid group is attached to at least two alkenoxy radicals. The invention relates more particularly to alpha, beta-unsaturated esters of carbonic acid and aliphatic orthocarboxylic acids.

By the carboxylic acid group is meant the group

which is capable of forming esters either in this form or in the hydrated,

form. This term, as used in the specification and claims, includes therefore carbonic acid and orthocarboxylic acids. The term "alpha, beta-unsaturated" indicates that the unsaturation is in the alpha position with respect to the carbinol carbon of the alcohol portion of the ester.

An object of the present invention is to provide a new and simple process for the preparation of monomers of alpha, beta-unsaturated esters of organic polybasic acids, in which esters the carbon atom of a carboxylic acid group is attached to at least two alkenoxy radicals. A further object is to provide new and useful synthetic resins by the polymerization of these alpha, beta-unsaturated esters. A still further object is to provide new and improved synthetic resins by the interpolymerization of these alpha, beta-unsaturated esters with one or more different polymerizable organic compounds. Other objects will be apparent from the description of the invention given hereinafter.

The above objects are accomplished according to the present invention by preparing alpha, beta-unsaturated esters of organic polybasic acids in which esters the carbon atom of a carboxylic acid group is attached to at least two alkenoxy radicals, by ester interchange of the alpha, beta-unsaturated alcohols with saturated esters of these acids; further by polymerizing these esters either alone or with one or more different polymerizable compounds, said latter compounds being vinylidene compounds.

Certain of the monomeric alpha, beta-unsaturated esters herein described may be prepared by methods previously described in the art such, for example, as reacting the alcohols with carbonyl chloride, chloroform, or with the corresponding acid nitriles in the presence of hydrogen chloride. These methods are not satisfactory when alcohols which are sensitive to acids, such as methyl allyl alcohol, are used. It has now been discovered that these alpha, beta-unsaturated esters may be prepared simply and in excellent yields by an ester interchange method. According to a preferred process of this invention for producing these monomeric alpha, beta-unsaturated esters, organic polybasic acid esters of a volatile saturated alcohol, in which esters the carbon atom of a carboxylic acid group is attached to at least two alkoxy radicals, are heated with an excess of the alpha, beta-unsaturated alcohol, preferably in the presence of a catalyst such as sodium or litharge. As the ester interchange reaction proceeds, the lower boiling saturated alcohol is removed by fractional distillation, and such distillation is continued until the saturated alcohol has been completely distilled from the reaction mixture. The unsaturated ester is then separated from the excess unsaturated alcohol and/or any unreacted saturated ester, preferably by fractional distillation under reduced pressure. The alpha, beta-unsaturated esters so obtained are polymerized alone or, preferably, interpolymerized with other compounds, said latter compounds being polymerizable vinylidene compounds, by any of the known procedures described in the art.

In the specification and claims, the term "polymerization" is used in a generic sense to cover the polymerization of a single monomeric polymerizable compound or the simultaneous polymerization of two or more different monomeric polymerizable substances. The term "polymer" is inclusive of both the product formed from the polymerization of a single monomeric compound or the product obtained by the simultaneous polymerization of two or more different monomeric polymerizable substances. When polymerization of two or more different monomeric substances is specifically intended, the polymerization will be termed "interpolymerization" and the product so produced will be designated as an "interpolymer."

The following examples illustrate specific embodiments of the invention wherein all parts are given by weight unless otherwise stated. In the following examples, the preparation of the monomeric esters, their polymerization, and the interpolymerization of these esters with other compounds, said latter compounds being polymerizable vinylidene compounds, are given in detail. The term "vinylidene" is used throughout the specification as including "vinyl," i. e., vinyl compounds form a sub group of compounds within the larger group of vinylidene compounds.

Example 1

To a mixture comprising 118 parts of diethyl carbonate and 288 parts of methallyl alcohol was added approximately 0.3 part of sodium. The mixture was refluxed under a fractionating column, and ethyl alcohol was removed by fractional distillation at such a rate that the temperature at the top of the column remained at 78–80° C. When the theoretical amount of ethyl alcohol had distilled, the excess methallyl alcohol was removed by distillation. The residue was fractionated under reduced pressure, and a yield of 152 parts (88 per cent of the theoretical) of dimethallyl carbonate boiling at 99–101° C./28 mm. was obtained. The ester possessed an iodine number of 299.

Diallyl carbonate (boiling at 72–75° C./30 mm.) was obtained in 86 per cent of the theoretical yield by ester interchange of allyl alcohol with diethyl carbonate in the manner outlined above. Similarly, dicrotyl carbonate (boiling at 137–141° C./28 mm.) and difurfuryl carbonate were prepared in excellent yields by ester interchange of crotyl and furfuryl alcohols, respectively, with diethyl carbonate.

Example 2

A mixture consisting of 38 parts of ethyl orthoformate and 110 parts of methallyl alcohol, to which was added a small piece of sodium, was refluxed under a fractionating column as in Example 1. When no further ethyl alcohol distilled from the reaction mixture, the excess of methallyl alcohol was removed by fractional distillation. Thirty-seven parts of methallyl orthoformate (boiling at 117–120° C./13 mm.) were obtained. By using allyl alcohol in place of methallyl alcohol as above, allyl orthoformate may be prepared in good yield.

Example 3

Eighty-one parts of ethyl orthoacetate, 216 parts of methallyl alcohol, and 0.3 part of sodium were refluxed under a column until no further ethyl alcohol distilled. After removing the excess of methallyl alcohol under reduced pressure, a clear colorless liquid boiling at 62–80° C./7 mm. was obtained. On further fractionation of this liquid, the unsaturated orthoesters, diethyl methallyl orthoacetate (boiling at 62–64° C./7 mm.) and ethyl dimethallyl orthoacetate (boiling at 78–80° C./7 mm.) were obtained.

Example 4

A small sample of dimethallyl carbonate was heated with 1 per cent by weight of benzoyl peroxide at 65° C. After 20 hours, the liquid had polymerized to a soft gel-like polymer which was insoluble in organic solvents such as toluene, butyl acetate, dioxan or acetone. Similarly, diallyl carbonate polymerized to a soft insoluble gel-like resin when heated 18–20 hours at 65° C. with 1.0 per cent of benzoyl peroxide.

Example 5

A mixture comprising 90 parts of methyl methacrylate and 10 parts of dimethallyl carbonate was heated for 6 days at 65° C. in the absence of catalyst. The monomer mixture interpolymerized to a clear, colorless, hard, tough, glass-like mass free from bubbles. The interpolymer softened at 92° C. and was insoluble in toluene, dioxan, and butyl acetate. By adding 0.05 per cent of benzoyl peroxide to the above monomeric mixture, an interpolymer having similar properties was obtained after heating for only 1 day at 65° C. Interpolymers prepared similarly from methyl methacrylate and larger amounts of dimethallyl carbonate (i. e., 20 or 30 per cent) are likewise hard, tough, and insoluble, but soften at lower temperatures.

Granular interpolymers of methyl methacrylate with dimethallyl carbonate were prepared as follows: A mixture of 99 parts of methyl methacrylate, 1 part of dimethallyl carbonate, 1 part of benzoyl peroxide, and 200 parts of a 0.3 per cent aqueous solution of a neutralized interpolymer of methyl methacrylate and methacrylic acid was heated in a three-neck flask equipped with a thermometer, stirrer, and reflux condenser. After heating with stirring on a steam bath for 40 minutes, a granular interpolymer was obtained in 73 per cent of the theoretical yield. A chip molded from this interpolymer softened at 103° C. and was insoluble in common organic solvents.

Granular interpolymers containing 1–30 per cent of dimethallyl carbonate, all of which were insoluble in common organic solvents, were prepared in the above manner. Increasing the amount of dimethallyl carbonate resulted in products which softened at lower temperatures.

Example 6

A mixture comprising 45 parts of vinyl acetate monomer, 5 parts of dimethallyl carbonate, 0.5 part of benzoyl peroxide and 150 parts of a 0.3 per cent aqueous solution of a neutralized methyl methacrylate-methacrylic acid interpolymer was heated with stirring on a steam bath for 3½ hours. Forty-three parts of a solid, granular interpolymer which was insoluble in toluene, dioxan, acetone, and butyl acetate were obtained. A chip molded from this interpolymer softened at 62° C., whereas a chip molded from an unmodified granular vinyl acetate polymer prepared in the same manner softened at approximately 35° C. Cast or granular interpolymers of dimethallyl carbonate with vinyl acetate ranging from 2–10 per cent in carbonate content were prepared, all of which were insoluble in organic solvents and possessed higher softening points than unmodified vinyl acetate polymers prepared under similar conditions.

Example 7

A granular interpolymer of dimethallyl carbonate and styrene was prepared by heating a mixture comprising 41 parts of styrene, 1 part of dimethallyl carbonate, 0.4 part of benzoyl peroxide and 150 parts of a neutralized 0.3 per cent aqueous solution of a methyl methacrylate-methacrylic acid interpolymer for 6 hours, as in Example 6. The interpolymer, obtained in 93 per cent of the theoretical yield, molded readily to give a clear, colorless product.

A cast interpolymer comprising 98 per cent of styrene and 2 per cent of dimethallyl carbonate prepared by heating the monomers 4 days at 60° C. with 1 per cent of benzoyl peroxide was clear and hard and softened at 65° C. The interpolymer was soluble in aromatic hydrocarbons such as toluene or xylene and also in dioxan or butylacetate.

Example 8

Ninety parts of methyl methacrylate and 10 parts of diallyl carbonate were heated for 5 days at 65° C. The mixture interpolymerized to a clear, hard, tough interpolymer relatively free from bubbles. The interpolymer was insoluble in common organic solvents and softened at 92° C.

A granular interpolymer consisting of 10 per cent of diallyl carbonate and 90 per cent of vinyl acetate was prepared in the manner described in Example 6. The interpolymer, obtained in 76 per cent of the theoretical yield, was insoluble in toluene, dioxan, acetone, and butyl acetate.

Cast or granular interpolymers of methyl methacrylate or other polymerizable vinylidene compounds with dicrotyl or difurfuryl carbonate may be prepared in the above manner. The interpolymers are less soluble in toluene than the unmodified polymeric vinylidene compounds.

*Example 9*

A mixture of 45 parts of methyl methacrylate, 5 parts of methallyl orthoformate, 0.5 part of benzoyl peroxide, and 150 parts of a 0.3 per cent aqueous solution of a neutralized methyl methacrylate-methacrylic acid interpolymer was heated with stirring for 50 minutes on a steam bath. Thirty-eight parts of a granular interpolymer which was insoluble in common organic solvents were obtained. On molding the granules, a clear, colorless, hard, and tough mass which softened at 96° C. was obtained.

*Example 10*

A cast interpolymer consisting of 90 per cent of methyl methacrylate and 10 per cent of ethyl dimethallyl orthoacetate was prepared by heating the monomer mixture for 2 days at 60° C. The clear, hard, tough, resinous mass so obtained softened at 86° C. and was difficultly soluble in toluene, dioxan, or butyl acetate. Cast interpolymers of methyl methacrylate with 10 per cent of diethyl methallyl orthoacetate softened at 84° C. and were soluble in the above solvents.

It will be understood that the above examples are merely illustrative and that the present invention broadly comprises the process for producing monomers of alpha, beta-unsaturated esters of organic polybasic acids wherein at least two of the acidic hydroxyls are attached to the same carbon atom, particularly esters of carbonic acid and aliphatic ortho acids, the polymerization of said monomers and the interpolymerization of these monomers with one or more different polymerizable compounds, said latter compounds being polymerizable vinylidene compounds.

Among the alpha, beta-unsaturated primary alcohols adapted for use in the present invention may be mentioned methallyl alcohol, allyl alcohol, furfuryl alcohol, crotonyl alcohol, tiglyl alcohol; 1,2-butadienol-4; 3-chlorobutene-2-ol-1; hexadiene-2,4-ol-1; 3,7-dimethyl-octadiene-2,7-ol-1; propargyl alcohol, cinnamyl alcohol, etc. It is preferred, however, that the esters be of aliphatic alcohols having not more than 18 carbon atoms and having at least one double bond for each six carbon atoms. Esters of alpha-methylene primary aliphatic alcohols are preferred. In place of one such alcohol, two or more different alpha, beta-unsaturated alcohols may be employed, and thereby esters containing two or more different unsaturated groups may be prepared.

The alpha, beta-unsaturated esters of carbonic and aliphatic orthocarboxylic acids are of particular interest in the present invention. Specific aliphatic orthocarboxylic acids include ortho- formic and orthoacetic acids, which are preferred, and the ortho acids corresponding to propionic, butyric, isobutyric, valeric, chloroacetic, oxalic, malonic, succinic, adipic, crotonic, acrylic, and methacrylic acids. Esters of aromatic ortho acids such as orthobenzoic acid or the ortho acids corresponding to phthalic, terephthalic, chlorobenzoic, nitrobenzoic, toluic, naphthoic acids, etc., also are adapted for use in the present invention. Also useful are the esters of aryl-aliphatic ortho acids such as the ortho acids corresponding to phenylacetic, toluylacetic, phenylpropionic, naphthylacetic acids, etc. However, the aliphatic acids (in which at least two acidic hydroxyls are attached to the same carbon atom) are greatly preferred since they are better known, more available, and lend themselves readily to the process of this invention.

It will be observed from the examples that the ethyl esters have been employed as starting materials for the ester interchange reactions. Other esters will function satisfactorily, but it is preferred to use saturated esters of relatively low boiling alcohols such as methyl or ethyl alcohols, since the latter may be separated from the reaction mixtures more readily than higher boiling alcohols. However, esters of propyl, isopropyl, butyl, sec. butyl and isobutyl alcohols are satisfactory.

It is preferable that a catalyst be employed to accelerate the ester interchange reaction. Suitable catalysts include sodium, sodium alcoholates, litharge, organic bases and the like. Acidic catalysts may also be used except in those cases where the alcohols are sensitive to acidic materials. While preferred, it is not essential that catalysts be employed for the successful operation of the ester interchange reaction described herein.

The polymerization of the alpha, beta-unsaturated esters herein considered, or the interpolymerization of these esters with other compounds, said latter compounds being polymerizable vinylidene compounds, may be carried out by means such as those illustrated in the examples. The usual polymerizing catalysts are effective in promoting the polymerization of these alpha, beta-unsaturated esters or the interpolymerization of these esters with such other polymerizable compounds. Among these polymerization catalysts may be mentioned organic peroxides, hydrogen peroxide, actinic light, acidic salts, etc. Certain of the alpha, beta-unsaturated esters tend to accelerate the polymerization of other polymerizable materials, and, in such cases, castings which are relatively free from bubbles may be obtained more readily by simply warming the monomers in the absence of catalysts. In the preparation of interpolymers, the amount of alpha, beta-unsaturated ester in the monomer mixture may be varied over wide limits depending on the results desired. One, two, or more alpha, beta-unsaturated esters may be included in the monomer mixture. Interpolymerization of even small amounts of these esters with other polymerizable materials usually results in products which are either insoluble or difficultly soluble in common organic solvents.

It is not intended to limit the present invention to any specific range of proportions of the alpha, beta-unsaturated esters to the vinylidene compounds. The properties of the resulting interpolymers, such as solubility, softening point, toughness, etc., may be varied over a rather wide range by varying the proportion of alpha, beta-unsaturated esters present in the composition With respect to the vinylidene compounds for interpolymerization with the alpha, beta-unsaturated esters of carbonic acid and the alpha, beta-unsaturated esters of orthocarboxylic acids, those coming within the present invention consist of polymerizable compounds containing a methylene (CH₂) group attached through an ethylenic double bond to a carbon atom itself attached to at least one negative group, i. e., those compounds of the formula

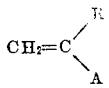

in which R is either hydrogen, alkyl, aryl, aralkyl, cycloalkyl, or halogen, and A is either halogen, aryl, cyano, acyloxy, vinyl or

where X is hydrogen, hydroxy, halogen, alkyl, alkoxy, or aryloxy, or where A is

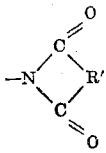

where R' is a bivalent hydrocarbon radical, or where A is

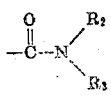

where R₂ and R₃ are hydrogen or alkyl radicals. These vinylidene compounds include vinyl esters, vinyl halides, acrylic acid and its amides, halides and esters, alpha alkyl acrylic acids and their amides, halides and esters such as methacrylic acid, methyl and ethyl methacrylate, methacrylamide, methacrylyl chloride; vinyl succinimide, acrolein, N-methyl-acrylamide, N-ethyl methacrylamide, N-dipropyl acrylamide, N-methylethyl acrylamide, butadiene, chloroprene, methylvinyl ketone, and the various specific vinylidene compounds disclosed in the examples.

The herein described alpha, beta-unsaturated esters of carbonic acid and the alpha-beta-unsaturated orthoesters of aliphatic carboxylic acid may be employed alone or in combination with other polymerizable materials for the preparation of casting articles and molding powders. The interpolymers of this invention either alone or in the presence of materials such as other resinous products, plasticizers, fillers, etc., are useful for the preparation of such articles as tumblers, dishes, screws, caps, combs, buttons, and other types of molded products. Interpolymers may be prepared which are insoluble or difficultly soluble in common organic solvents, and which are useful therefore in applications wherein soluble synthetic resinous polymers are unsuitable such, for example, as for coating wire, wood, paper, and textiles exposed to organic solvents.

An advantage of the present invention is that it provides new polymers having improved properties of solubility and softening point which adapt them for wide use in the plastic and coating fields. A further advantage is that the invention provides new and useful polymers which are insoluble in the common organic solvents. Whereas many of the substances usually used to bring about cross-linking polymerize very readily alone, and in some cases cannot be stored without inhibitors, the unsaturated esters of this invention can be stored under normal conditions without polymerization taking place. Another advantage is that the softening temperature of polymeric vinyl acetate can be raised 10–30° C. by interpolymerizing vinyl acetate with small amounts of some of the monomeric products of this invention such as dimethallyl or diallyl carbonate. This property is of great importance in the field of molding and coating compositions, where the low softening point of vinyl acetate has long been a disadvantage. A still further advantage of this invention is that alpha, beta-unsaturated esters of carbonic acid as well as alpha, beta-unsaturated orthoesters of aliphatic carboxylic acid may be prepared by a simple operation and in excellent yields.

As many widely different embodiments of this invention may be made without departing from the spirit and scope thereof; it is to be understood that the invention is not limited to the specific embodiments thereof except as defined in the appended claims.

We claim:

1. A composition comprising an interpolymer of dimethallyl carbonate and vinyl acetate.

2. A resinous composition of matter comprising a polymer of a diester of carbonic acid in which ester each acid group of the carbonic acid is esterified with a monohydric unsaturated alcohol containing at least three carbon atoms and having an aliphatically unsaturated carbon-to-carbon linkage in the alpha, beta position with respect to the carbinol carbon atom therein.

3. A resinous composition of matter comprising an interpolymer of a polymerizable vinyl compound and a polymerizable diester of carbonic acid in which ester each acid group of the carbonic acid is esterified with a monohydric unsaturated alcohol containing at least three carbon atoms and having an aliphatically unsaturated carbon-to-carbon linkage in the alpha, beta position with respect to the carbinol carbon atom therein.

4. A resinous composition of matter comprising a polymer of a symmetrical diester of carbonic acid and a monohydric unsaturated alcohol containing at least three carbon atoms and having an aliphatically unsaturated carbon-to-carbon linkage in the alpha, beta position with respect to the carbinol carbon atom therein.

5. A resinous composition of matter comprising polymerized diallyl carbonate.

6. A resinous composition of matter comprising an interpolymer of vinyl acetate and diallyl carbonate.

7. A resinous composition of matter comprising a polymer of an ester of an organic acid from the group consisting of carbonic acid and orthocarboxylic acids in which ester at least two acid groups of the organic acid are esterified with a monohydric unsaturated alcohol containing at least three carbon atoms and having an aliphatically unsaturated carbon-to-carbon linkage in the alpha, beta position with respect to the carbinol carbon atom therein.

8. A resinous composition of matter comprising an interpolymer of an ester of an organic acid from the group consisting of carbonic acid and orthocarboxylic acids in which ester at least two acid groups of the organic acid are esterified with a monohydric unsaturated alcohol containing at least three carbon atoms and having an aliphatically unsaturated carbon-to-carbon linkage in the alpha, beta position with respect to the carbinol carbon atom therein, and another polymerizable compound, said latter compound being a vinylidene compound.

9. A resinous composition of matter comprising a polymer of a diester of carbonic acid in which ester each acid group of the carbonic acid is esterified with a monohydric unsaturated alcohol containing from 3 to 18 carbon atoms, inclusive, and having at least one aliphatically unsaturated carbon-to-carbon linkage for each 6 carbon atoms therein, one of said unsaturated linkages being in the alpha, beta position with respect to the carbinol carbon atom in said unsaturated alcohol.

10. A resinous composition of matter comprising a polymer of an ester of an organic acid from the group consisting of carbonic acid and orthocarboxylic acids in which ester at least two acid groups of the organic acid are esterified with a monohydric unsaturated alcohol containing from 3 to 18 carbon atoms, inclusive, and having at least one aliphatically unsaturated carbon-to-carbon linkage for each 6 carbon atoms therein, one of said unsaturated linkages being in the alpha, beta position with respect to the carbinol carbon atom in said unsaturated alcohol.

HENRY J. RICHTER.
HENRY S. ROTHROCK.